United States Patent [19]
Rosker et al.

[11] Patent Number: 5,331,403
[45] Date of Patent: Jul. 19, 1994

[54] PULSED DIODE RING LASER GYROSCOPE

[75] Inventors: Mark J. Rosker; William R. Christian, both of Newbury Park; Ian C. McMichael, Port Heuneme, all of Calif.

[73] Assignee: Rockwell International Corporation, Seal Beach, Calif.

[21] Appl. No.: 802,029

[22] Filed: Dec. 3, 1991

[51] Int. Cl.$^5$ ............................................. G01C 19/64
[52] U.S. Cl. ......................................... 356/350; 372/94
[58] Field of Search ........................... 356/350; 372/94

[56] References Cited

U.S. PATENT DOCUMENTS 5,148,237 9/1992 Schaefer ............................. 356/350

Primary Examiner—Samuel A. Turner
Attorney, Agent, or Firm—John C. McFarren

[57] ABSTRACT

A pulsed diode ring laser gyroscope and method of modulation are provided to greatly reduce the occurrence of frequency locking in optical gyroscopes at low rotational rates. One or two optical diodes serve as optical amplifiers for a pair of counterpropagating optical pulses circulating in an optical ring resonator. The amplifiers are driven twice each round trip (once for each pulse) using pulses much shorter than the round trip time. The short optical pulses overlap in regions of the resonator generally isolated from light scattering elements. The pulses are produced by gain switching the optical amplifiers with an electrical current pulse train having a fundamental period synchronous with the optical round trip time in the resonator cavity. With this modulation scheme, the diodes can be thought of as gates that open twice each round trip-once for each of the counterpropagating pulses. During each on time, the diodes amplify only a clockwise or counterclockwise pulse. Backscattered light from any optical element, which is not coincident with either of the pulses, is absorbed by the amplifiers.

16 Claims, 3 Drawing Sheets

PULSED DIODE RING LASER GYROSCOPE

TECHNICAL FIELD

The present invention relates to ring laser gyroscopes and, in particular, to a pulsed diode ring laser gyroscope and a method of modulation to eliminate frequency locking caused by residual backscatter.

BACKGROUND OF THE INVENTION

Ring laser gyroscopes of conventional design are limited in sensitivity at low rotation rates by the phenomenon of frequency locking. Frequency locking in ring laser gyroscopes results from the coupling of counterpropagating optical waves caused by backscatter from optical elements in the laser cavity. A variety of approaches, such as reducing the amount of light scattered from optical elements or mechanically dithering the cavity, have been used to diminish the effect of frequency locking. These techniques, however, have not been entirely satisfactory. Thus, measuring angular rates comparable to those of the Earth's rotational rate with an all-optical system remains a problem.

The subject matter of the present invention is related to that of U.S. Pat. application Ser. No. 07/582,738 entitled "Dual Optical Amplifier Ring Laser Gyroscope with Reduced Phase Locking," filed on Sept. 14, 1990, by Gerald L. Vick and assigned to the same assignee as the present application. The teachings of the Vick application are incorporated herein by reference. Vick uses a pair of semiconductor optical amplifiers (SOAs) spaced at a distance of ¼ the length of the optical ring. The amplifiers are driven for one-half the light pulse round trip time. During the on time, each amplifier amplifies both a clockwise and a counterclockwise pulse, one after the other. This modulation scheme prevents counterpropagating light pulses from meeting in the amplifiers and eliminates coupling caused by backscatter from the amplifiers. However, the modulation scheme described by Vick does not address the problem of backscattering from optical elements other than the amplifiers, such as optical fibers or output couplers, which may also lead to frequency locking. Thus, there is a need for an improved ring laser gyroscope and an optical pulse modulation scheme to prevent frequency locking caused by residual backscatter.

SUMMARY OF THE INVENTION

The present invention comprises a pulsed diode ring laser gyroscope and a method of modulating its optical pulses. One or two optical diodes, or semiconductor optical amplifiers (SOAs), generate a pair of counterpropagating optical pulses circulating in an optical ring resonator. The ring resonator may be constructed of bulk-optic components or fiber-optic loops connecting the amplifiers. The amplifiers are driven twice each period, or round trip time, of the ring resonator (once for each pulse) using pulses much shorter than the round trip time. The short, counterpropagating optical pulses cross in two regions of the resonator generally selected to be isolated from light scattering sources such as amplifiers and couplers. The pulses are produced by gain switching the optical diodes with an electrical current pulse train having a fundamental period synchronous with the optical round trip time in the resonator cavity. Synchronization must be highly precise for mode locking to occur. Each period of the pulse train consists of two separate current peaks in which the current rises above the threshold level for laser operation. With two amplifiers, the separation between the two peaks in time is equal to the optical transit time between the diodes. With a single amplifier, separate but oppositely directed pulses are applied to the amplifier to generate the counterpropagating pulses. Using this modulation scheme, the diodes can be thought of as gates that open twice each round trip-once for each of the counterpropagating pulses. During each on time, the diodes amplify only a clockwise or counterclockwise pulse. Light that is not coincident with either of the pulses, such as light backscattered from any optical element, strikes an amplifier during its off time and is merely absorbed.

A principal object of the invention is the measurement of very low angular rates of rotation using an all-optical system. A feature of the invention is the modulation of one or a pair of optical amplifiers in an optical ring resonator to reinforce a pair of counterpropagating optical pulses and to absorb undesirable backscattered light. An advantage of the invention is the elimination of frequency locking by residual backscatter that heretofore prevented measurement of low angular rates of rotation with an optical ring laser gyroscope.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Unlike continuous wave laser gyroscopes, pulsed laser gyros may incorporate solid-state devices, such as semiconductor optical amplifiers (SOAs), that can be modulated to eliminate undesirable frequency locking caused by backscattered light. Frequency locking of this type can be avoided by a pulsed laser gyroscope because light propagated in one direction is temporally separated from its backscattered light. Furthermore, continuous wave ring laser gyros are subject to gain competition, which leads to highly unstable operation. Gain competition is avoided in pulsed laser gyros because the counterpropagating pulses do not overlap temporally in the optical amplifiers.

Figure 1:
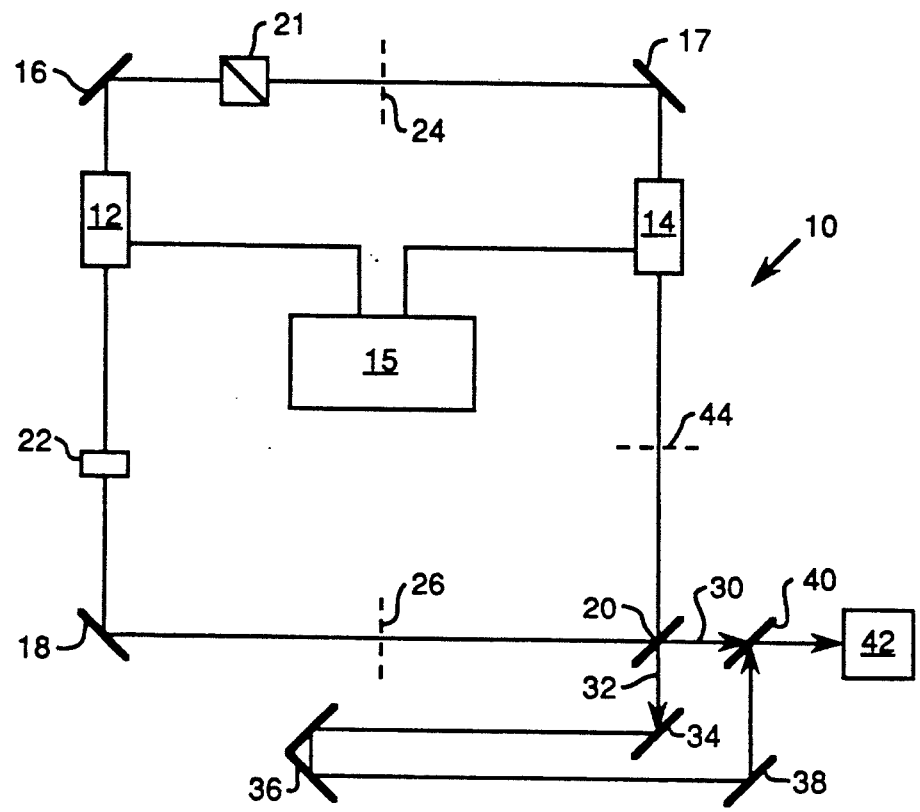
FIG. 1 is a schematic diagram of a bulk-optic ring laser gyroscope of the present invention having a pair of semiconductor optical amplifiers.

A bulk-optic embodiment of a pulsed diode laser gyroscope 10 is illustrated schematically in FIG. 1.

Gyroscope 10 comprises an optical ring resonator having a pair of nearly identical semiconductor optical amplifiers (SOAs) 12 and 14. The optical ring resonator is formed by mirrors 16, 17, and 18, and an output coupler 20. The ring resonator may also include a polarizer 21 and an etalon 22. The bulk-optic embodiment of gyroscope 10 illustrated schematically in FIG. 1 may be constructed as a fiber-optic embodiment (described below) to reduce the physical size and complexity of gyroscope 10 while increasing its mechanical stability.

Amplifiers 12 and 14, which may comprise 1.3 μm InGaAsP buried crescent diodes, for example, are powered by an electrical driver 15 to generate counterpropagating laser pulses in the ring resonator. Amplifiers 12 and 14 are driven by identical current pulses spaced so that the counterpropagating laser pulses collide with each other at locations, such as indicated by dotted lines 24 and 26, that may be several times the pulse width away from any optical devices in the ring resonator. This effectively decouples the pulses from each other to avoid frequency locking. Amplifiers 12 and 14 are separated by a distance that is not equal to one-half the round trip length of the ring resonator. The minimum separation between amplifiers 12 and 14 is that distance necessary to ensure complete gain recovery in the diodes between pulses.

Figure 2:
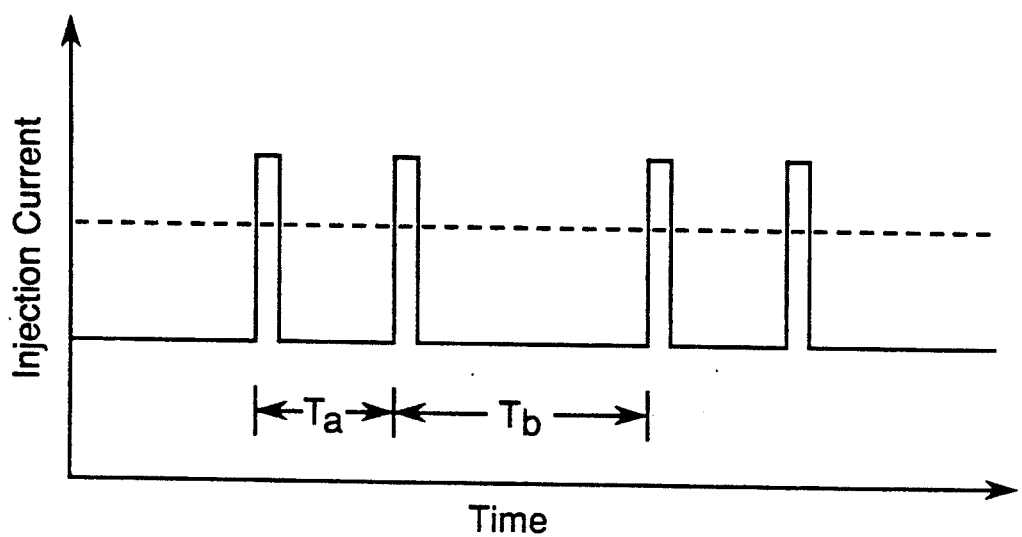
FIG. 2 is a plot of injection current versus time illustrating the modulation scheme for the pair of semiconductor optical amplifiers of FIG. 1.

FIG. 2 plots injection current from driver 15 versus time as an example of a modulation scheme designed to avoid frequency locking. The pulse sequence shown in FIG. 2 is applied to both amplifiers 12 and 14 simultaneously. Times $T_a$ and $T_b$ (where $T_a \neq T_b$) are the times for light to travel between amplifiers 12 and 14 along the two directions of the ring resonator. $T_a$ plus $T_b$ is the fundamental period T, or round trip travel time, of the ring resonator. Each period T of the pulse train comprises two separate peaks in which the current rises above a threshold level (indicated by a dotted line) for laser operation. As illustrated, the width of each current pulse is chosen to be much less than both $T_a$ and $T_b$.

The gain switching scheme illustrated by the pulse train of FIG. 2 can be thought of as opening gates (i.e., the SOAs) twice each round trip, once for pulses travelling in each direction. Because the current level is kept close to the threshold condition, only light that transits both SOAs when there is gain (i.e., when the current is in the high state) will be amplified sufficiently for laser operation. Thus, any light (e.g., backscattered light) that is not synchronous with one of the two counterpropagating pulses will be suppressed.

In a conventional ring laser gyroscope, rotation sensing is accomplished by measuring the Sagnac effect, in which rotation changes the laser frequency slightly for each counterpropagating light beam. By impinging the two outputs of the ring laser onto a detector, the small relative frequency change is observed as a frequency beat. This detection technique is utilized in the present invention by adding a delay to one of the two pulses so that they overlap temporally at the detector. In FIG. 1, this is demonstrated by using output coupler 20 to provide output pulses 30 and 32. Pulse 32 is directed and adjustably delayed by mirrors 34, 36, and 38 so that pulses 30 and 32 are merged by beam combiner 40 and directed onto detector 42. The delay is adjusted by positioning mirror 36 so that output pulses 30 and 32 overlap temporally at detector 42.

Initial experiments were conducted with the bulk-optic gyroscope 10 illustrated in FIG. 1. Gyroscope 10 was found to have an adjustable frequency bias that depends on the operating parameters. The sensitivity of the device was established using a Faraday modulator and a pair of λ/4 wave-plates to produce a 3.3° non-reciprocal phase shift inside the ring cavity. This is equivalent to the Sagnac effect produced by a rotation rate of approximately one (1) revolution per second. By changing the current applied to the Faraday crystal, it was established that the measured beat frequency changes linearly with non-reciprocal phase shift. There was an absence of frequency locking behavior in gyroscope 10 to the limits of resolution.

The performance of gyroscope 10 was found to be limited by the stability of the frequency bias, which gives rise to the linewidth of the frequency beat. Non-reciprocal mechanisms that may be responsible for the bias include: 1) deviations of the pulsing scheme from the idealized case shown in FIG. 2; 2) differences in the DC current applied to the diodes; 3) temperature differences between the diodes; 4) incomplete gain recovery on the time scale of the transit time around the resonator; and 5) nonlinear effects, such as the Kerr effect. The beat linewidth is determined by fluctuations in these physical effects. Because the sensitivity of gyroscope 10 scales proportionally with the linewidth of the frequency beat, it is necessary to identify and eliminate the largest of these noise sources from the system.

To obtain a passively mode locked ring laser gyroscope, one of the two amplifiers (amplifier 12, for example) of gyroscope 10 can be replaced with a saturable absorber, such as a multiple quantum well (MQW), for example. A major advantage of passive mode locking is that a sophisticated current scheme (such as illustrated in FIG. 2) is not required to obtain short optical pulses. For passive mode locking, amplifier 14 is supplied with a constant current to create counterpropagating optical pulses that collide within the saturable absorber and in free space at a location represented by dotted line 44. Backscattering associated with the saturable absorber can be reduced by either tilting the absorber or depositing antireflection coatings on its surfaces. The bulk-optic experiments described above suggest that residual backscatter from the absorber would be insufficient to cause significant frequency locking. Furthermore, a passively mode locked laser gyroscope is expected to provide narrower linewidths, resulting in improved resolution, because it is self-compensating with respect to slight cavity length fluctuations.

Figure 3:
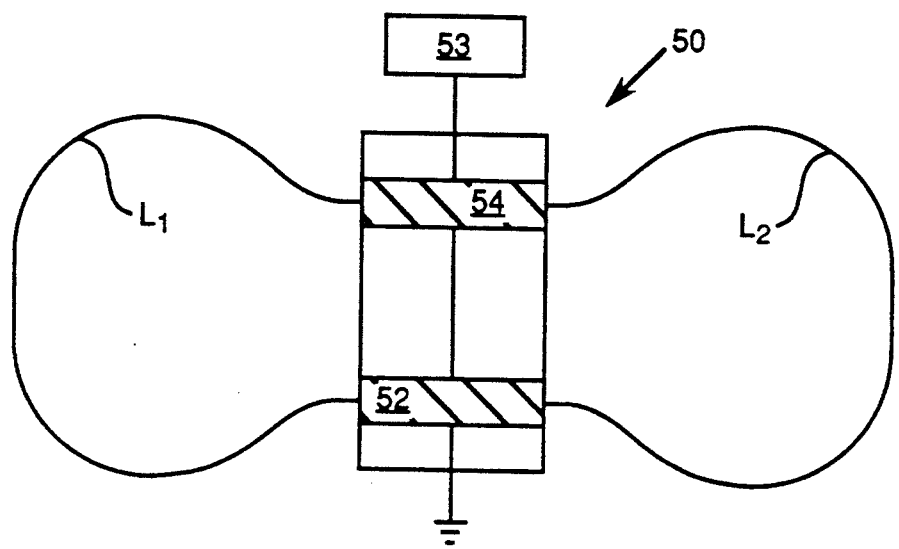
FIG. 3 is a schematic diagram of a fiber-optic ring laser gyroscope of the present invention having a pair of semiconductor optical amplifiers on a single chip.

A fiber optic embodiment of the present invention having two active gain elements (SOAs) is illustrated in FIG. 3. Gyroscope 50 is expected to provide several orders of magnitude improvement in rotation sensitivity as compared to bulk-optic gyroscope 10. By using fiber-optic loops, SOAs 52 and 54 can be positioned side-by-side on a single chip. The external resonator comprises a pair of single-mode optical fibers of lengths $L_1$ and $L_2$ ($L_2 > L_1$), with lensed tips so that light from the laser amplifiers 52 and 54 will be efficiently coupled to the guided mode of the fibers. Because loops $L_1$ and $L_2$ can be made almost arbitrarily large, the scale factor of gyroscope 50 can be increased substantially. Although the collisions between the counterpropagating light pulses occur in the physical media of the optical fibers, the bulk-optic experiments described above suggest that the level of Rayleigh backscatter occurring in the overlap region of the fibers would not be sufficiently large as to cause appreciable frequency locking. Mounting SOAs 52 and 54 on the same heat sink is expected to reduce the relative temperature fluctuations, and the DC bias can be applied by a single electrical driver 53 to eliminate relative current fluctuations. In addition, the resonator cavity can be made sufficiently large so that the gain recovery time is much shorter than the cavity transit time.

Figure 4:
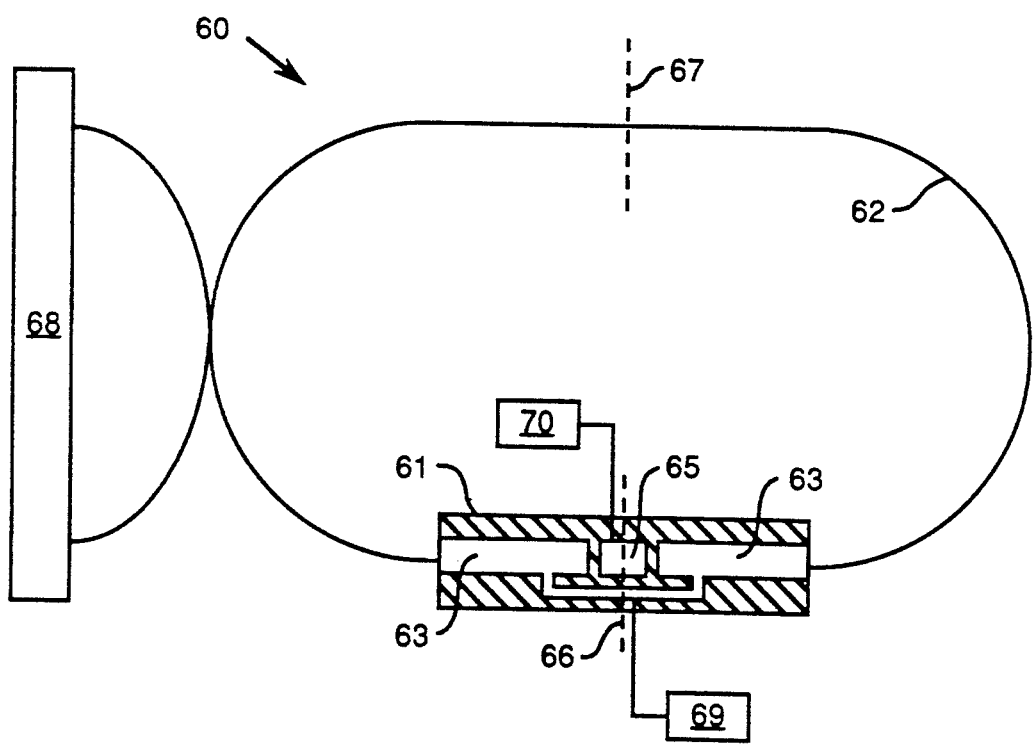
FIG. 4 is a schematic diagram of a passively mode locked, fiber-optic ring laser gyroscope of the present invention.

A fiber-optic version of a passively mode locked ring laser gyroscope is illustrated in FIG. 4. Gyroscope 60 includes a multi-segment semiconductor diode chip 61 with antireflection coatings on both end facets, an optical fiber loop 62, and an output coupler 68. Fiber loop 62 forms an external optical ring cavity for gyroscope 60. Multi-segment chip 61 is several millimeters long and comprises two matching DC biased regions 63 separated by a reverse biased segment 65 acting as a saturable absorber. Power sources 69 and 70 are connected to bias segments 63 and 65, respectively. Passive mode locking in gyroscope 60 produces counterpropagating optical pulses that collide at locations indicated by dotted lines 66 and 67. Improved stability is expected to result from having amplifier 63 and saturable absorber 65 mounted in close proximity on the same chip 61. Gyroscope 60 also includes delay elements and detectors (not shown) similar to those described above in conjunction with gyroscope 10. An entirely integrated version of gyroscope 60 could be made on a semiconductor wafer by replacing fiber loop 62 with a waveguiding structure.

Figure 5:
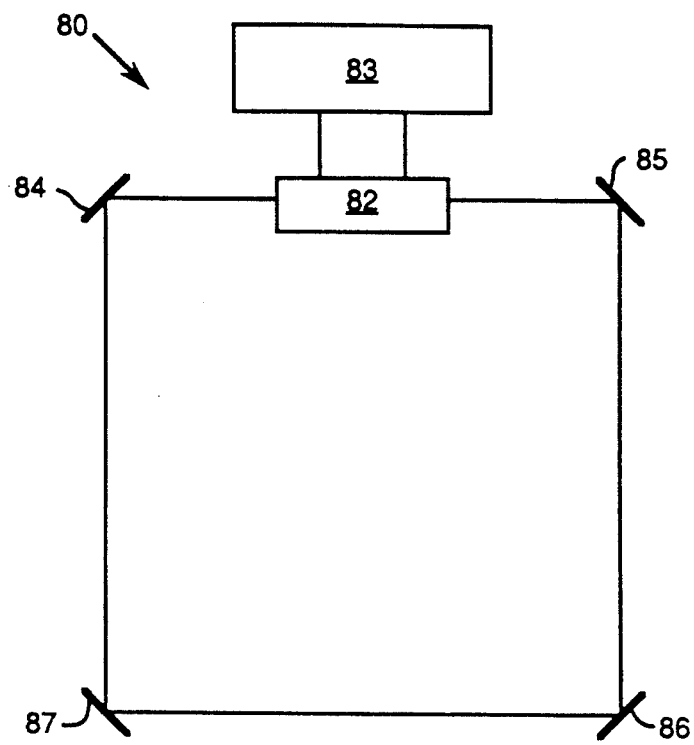
FIG. 5 is a schematic diagram of a bulk-optic ring laser gyroscope of the present invention having a single semiconductor optical amplifier.
Figure 6A:
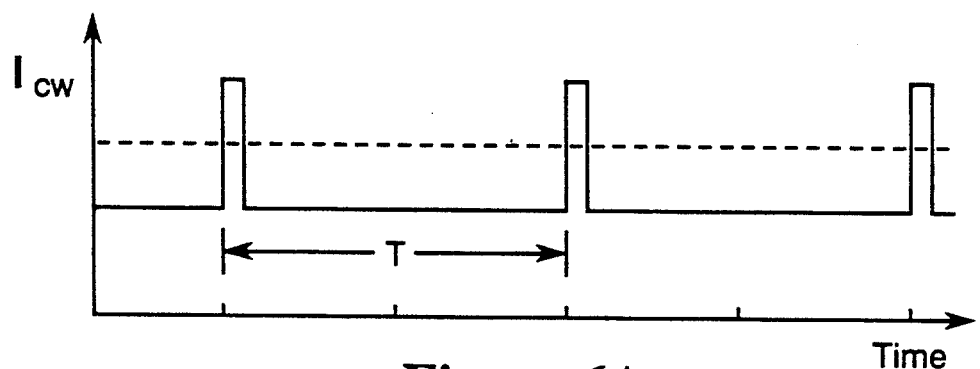
FIGS. 6A and 6B are plots of clockwise and counterclockwise injection currents, respectively, for the single semiconductor optical amplifier of FIG. 5.
Figure 6B:
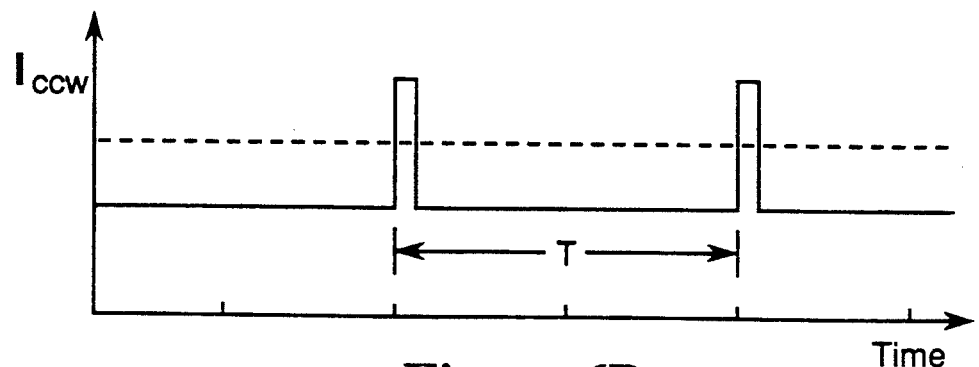

In another embodiment illustrated in FIG. 5, ring laser gyroscope 80 includes a single traveling wave semiconductor optical amplifier 82 and an optical cavity formed by mirrors 84, 85, 86, and 87. Electrical driver 83 applies oppositely directed current pulses, $I_{CW}$ and $I_{CCW}$, to amplifier 82 in the time sequences plotted in FIGS. 6A and 6B. The period T is the round trip time for optical pulses in the ring resonator of gyroscope 80. When amplifier 82 is on, light traveling in the direction of the current pulse in amplifier 82 receives greater amplification than light traveling counter to the direction of the current pulse. This, when combined with a recovery time for the gain that is faster than the time between oppositely directed current pulses (i.e., T/2), results in stable bidirectional operation without the use of two optical amplifiers as in gyroscope 10. Gyroscope 80 also includes delay elements and detectors (not shown) similar to those described above in conjunction with gyroscope 10.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A pulsed ring laser gyroscope, comprising:
   an optical ring resonator;
   a pair of semiconductor optical amplifiers connected within said ring resonator and separated by a distance not equal to one-half the length of said resonator, said optical amplifiers generating and amplifying counterpropagating optical pulses in said ring resonator, said counterpropagating optical pulses crossing at points in said ring resonator away from said amplifiers;
   means for driving said amplifiers simultaneously with current pulses synchronous with said optical pulses, said current pulses having a pulse width much less than a round trip period of said optical pulses in said ring resonator; and
   said current pulses turning said amplifiers on simultaneously to transmit and amplify only said counterpropagating optical pulses.

2. The ring laser gyroscope of claim 1, further comprising:
   an output coupler for directing said optical pulses out of said ring resonator;
   an optical delay external to said ring resonator for temporally delaying one of said optical pulses; and
   means for detecting a beat frequency produced by temporally overlapping said optical pulses.

3. The ring laser gyroscope of claim 1, further comprising a saturable absorber located in said optical ring resonator at one of said points where said counterpropagating optical pulses cross.

4. The ring laser gyroscope of claim 1, wherein said pair of semiconductor optical amplifiers are positioned on a single semiconductor chip.

5. The ring laser gyroscope of claim 1, wherein said ring resonator comprises a fiber-optic loop connected to said amplifiers.

6. A pulsed ring laser gyroscope, comprising:
   an optical ring resonator;
   a single semiconductor optical amplifier connected within said ring resonator, said optical amplifier generating and amplifying a first clockwise and a second counterclockwise optical pulses in said ring resonator, said optical pulses crossing at points in said ring resonator away from said optical amplifier;
   electrical means for driving said optical amplifier with current pulses synchronous with said first clockwise and second counterclockwise optical pulses, respectively, said current pulses having a pulse width much less than a round trip period of said optical pulses in said ring resonator; and
   said current pulses turning said optical amplifier on at times synchronous with said first and second optical pulses, respectively, to amplify said first clockwise optical pulse only in the clockwise direction and to amplify said second counterclockwise optical pulse only in the counterclockwise direction.

7. The ring laser gyroscope of claim 6, further comprising a saturable absorber located in said optical ring resonator at one of said points where said counterpropagating optical pulses cross.

8. The ring laser gyroscope of claim 6, further comprising:
   an output coupler for producing output optical pulses comprising portions of said first and second optical pulses;
   means for combining said output optical pulses to overlap temporally; and
   means for detecting a frequency beat produced by said temporally overlapped output optical pulses.

9. The ring laser gyroscope of claim 8, wherein said combining means further comprises an optical delay line external to said ring resonator for delaying one of said output optical pulses.

10. The ring laser gyroscope of claim 9, wherein said ring resonator comprises a fiber-optic loop connected to said pulsed diode.

11. A method of modulating a pulsed ring laser gyroscope, comprising the steps of:
   providing a pair of semiconductor optical amplifiers connected in an optical ring resonator;

separating said optical amplifiers by a distance not equal to one-half the length of said resonator;

generating and amplifying counterpropagating optical pulses in said ring resonator, said counterpropagating optical pulses crossing at points in said ring resonator away from said amplifiers;

driving said amplifiers simultaneously with current pulses synchronous with said optical pulses, said current pulses having a pulse width much less than a round trip period of said optical pulses in said ring resonator; and said current pulses turning said amplifiers, on simultaneously to transmit and amplify only said counterpropagating optical pulses.

12. The method of claim 11, further comprising the steps of:

directing a portion of said counterpropagating optical pulses out of said ring resonator as output optical pulses;

temporally delaying one of said output optical pulses;

combining said output optical pulses to overlap temporally; and detecting a frequency beat produced by said temporally overlapped output optical pulses.

13. The method of claim 12, further comprising the step of positioning said optical amplifiers on a single semiconductor chip.

14. The method of claim 13, further comprising the step of providing a waveguide structure integrated with said pair of semiconductor optical amplifiers on said semiconductor chip.

15. The method of claim 11, wherein said step of providing an optical ring resonator comprises providing a fiber-optic loop connected to said amplifiers.

16. The method of claim 11, further comprising the step of providing a saturable absorber in said optical ring resonator at one of said points where said counterpropagating optical pulses cross.

* * * * *